United States Patent [19]

Viesca y Viesca

[11] 3,991,753

[45] Nov. 16, 1976

[54] DEVICE FOR PREVENTING AN INDIVIDUAL FROM INHALING GERMS, FOREIGN BODIES, OR THE LIKE

[76] Inventor: Gabriel Viesca y Viesca, Insurgentes Sur 1180-401, Mexico City, Mexico

[22] Filed: Jan. 15, 1975

[21] Appl. No.: 541,211

[52] U.S. Cl............................ 128/146.2; 128/139; 2/9
[51] Int. Cl.² ........................................ A62B 7/00
[58] Field of Search............. 128/146.2, 146 R, 139, 128/140 R, 141 R; 2/9 R, 14 B, 14 H, 14 J, 14 K

[56] References Cited
UNITED STATES PATENTS

| | | | |
|---|---|---|---|
| 1,279,884 | 9/1918 | LaRoche............................ | 128/139 |
| 2,281,181 | 4/1942 | Clarke ................................ | 128/146 |
| 2,774,970 | 12/1956 | DuBois................................ | 2/9 R |
| 3,015,105 | 1/1962 | Rogowski............................ | 2/9 R |
| 3,103,667 | 9/1963 | Rogowski............................ | 2/9 R |

FOREIGN PATENTS OR APPLICATIONS

| | | | |
|---|---|---|---|
| 74,877 | 3/1929 | Sweden.............................. | 128/139 |

Primary Examiner—Robert W. Michell
Assistant Examiner—Henry J. Recla
Attorney, Agent, or Firm—Steinberg and Blake

[57] ABSTRACT

A device for preventing an individual from inhaling germs, foreign bodies, and the like. The device includes only a single sheet of a relatively light-weight plastic material which has an outer convex surface area and an opposed inner concave surface area defining for the sheet a hollow interior space adapted to receive the nose, mouth, and chin of an individual, with the sheet having connected thereto a structure for mounting the sheet on the head of the individual in such a way that while the nose, mouth, and chin of the individual are in the hollow interior of the sheet nevertheless the nose, mouth, and chin do not engage the inner surface area of the sheet. Preferably the sheet has a flat portion adapted to extend in front of the eyes and having a pair of regions to be situated respectively in front of the eyes, these regions being flat and clear and being capable of permitting light to pass through with substantially no light loss and without distortion of light rays so that the vision of the individual using the device will be substantially uneffected by the device.

6 Claims, 4 Drawing Figures

DEVICE FOR PREVENTING AN INDIVIDUAL FROM INHALING GERMS, FOREIGN BODIES, OR THE LIKE

BACKGROUND OF THE INVENTION

The present invention relates to devices intended to prevent an individual from inhaling germs, foreign bodies, and the like.

Devices of the above general type are of course already known. For example surgical masks are well known devices of this type. However, these known devices press against the head of the individual and are uncomfortable to wear, creating difficulties with respect to breathing, and in addition being somewhat unreliable because of the porous nature of the sheet material which forms masks of this type. Thus, masks of this latter type are in effect filters through which air is filtered while being inhaled. and of course because the filters are not perfect it is still possible to inhale microscopic germs through such devices.

Furthermore, conventional devices of the above type designed to present inhaling of germs, foreign bodies, and the like, do not protect the eyes of the individual. Thus, there are certain individuals who customarily carry out operations which require protection of the above general type. For example dentists can easily inhale germs and foreign bodies from a patient. As is well known, at the present time it is customary for dentists to use on the teeth of a patient supersonic devices which spray liquid while operating. Devices of this type thus cause part of the spray to intermingle with matter in the mouth of the patient, and such combined matter can easily spray out to the head of the dentist, often resulting in undesirable inhaling by the dentist of foreign bodies, germs, and the like. In addition, the eyes of the dentist are not protected.

Of course, reference to a dentist is only by way of example. Many laboratories technicians, for example, are subject to the same dangers and in addition many people who work in industry, with grinding or polishing machines, and the like, are subject to the same dangers.

SUMMARY OF THE INVENTION

It is accordingly a primary object of the present invention to provide a structure which will avoid the above drawbacks.

In particular, it is an object of the invention to provide a structure which will reliably prevent an individual not only from inhaling germs, foreign bodies, and the like, but also against injury or infection of the eyes.

Furthermore, it is an object of the present invention to provide a device of this type which is exceedingly simple and light-weight, while at the same time being comfortable to wear without creating any undesired distraction either to the wearer of the device or to an individual such as a patient who views another individual wearing the device of the invention.

Furthermore, it is an object of the present invention to provide a device of the above type which permits free breathing to take place while the individual wearing the device is fully protected.

Also, it is an object of the present invention to provide a device of the above type which will not undesirably affect the vision of the individual in any way.

Thus, it is an object of the present invention to provide an exceedingly inexpensive device of the above general type which is very comfortable to wear and which at the same time will achieve the desired objects.

According to the invention, the device includes a single sheet of light-weight plastic material having an exterior convex surface area and an inner concave surface area defining for the sheet a hollow interior which is adapted to receive the nose, mouth, and chin of an individual. A mounting means is connected with the sheet for mounting the latter on the head of the individual in such a way that while the nose, mouth, and chin of the individual are received in the hollow interior of the sheet nevertheless the nose, mouth, and chin do not engage the inner surface of the sheet. This sheet has a flat portion extending upwardly from the above surface areas thereof and having a pair of regions adapted to be situated in front of the eyes, these regions permitting light to pass therethrough with substantially no light loss and without any distortion so that the vision of the individual is substantially unaffected by the device of the invention. The mounting means takes the form of a pair of simple clips enabling the sheet to be attached at its upper edge to a pair of spectacles.

BRIEF DESCRIPTIONS OF DRAWINGS

The invention is illustrated by way of example in the accompanying drawings which form part of this application and in which.

DESCRIPTION OF A PREFERRED EMBODIMENT

Figure 1:
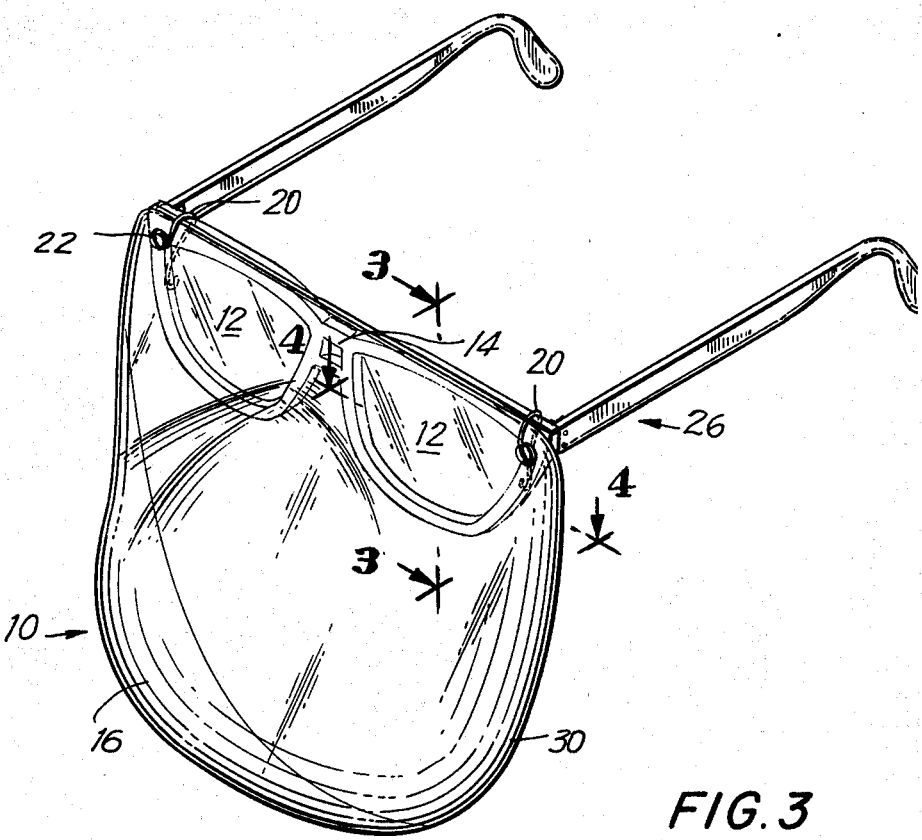
FIG. 1 is a perspective illustration of the device of the invention shown in FIG. 1 mounted on a pair of spectacles.

Referring now to the drawings, the device of the invention includes a single sheet 10 of light-weight plastic material. The sheet 10 is substantially rigid and may be made of any one of a number of suitable plastic materials such as polystyrene, polyvinylchloride, polyethylene, or even any suitable polymide such as nylon. It is only required that the plastic sheet 10 be substantially rigid. It is also preferred if the sheet 10 is of a clear, colorless plastic material. This latter characteristic is required, however, for a pair of regions 12 of an upper substantially flat portion 14 of the sheet 10.

Figure 2:
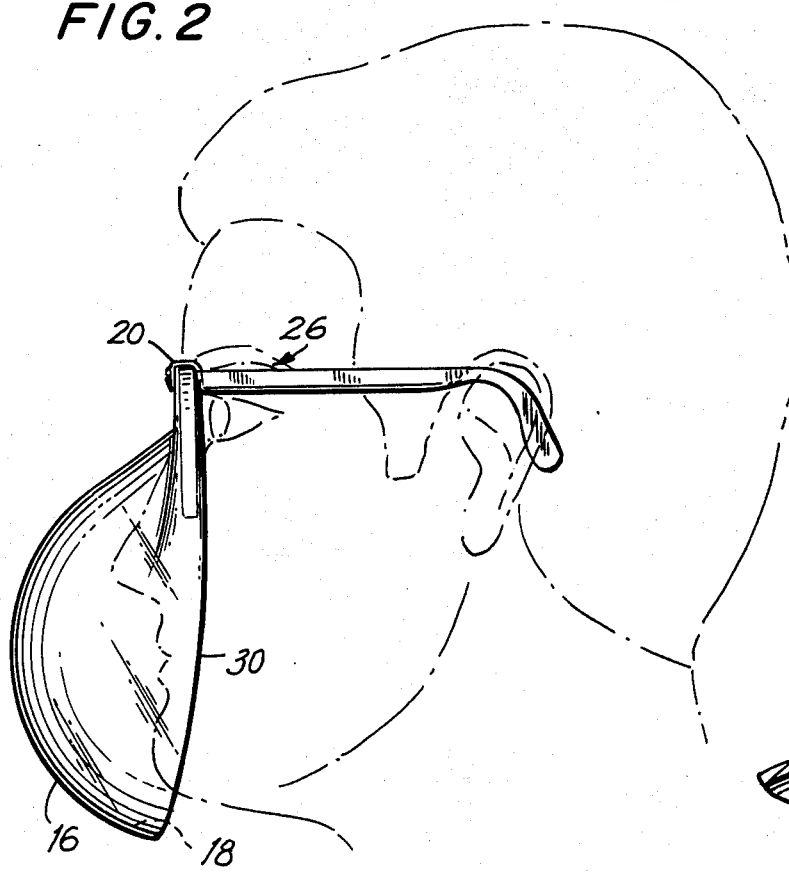
FIG. 2 is a side view of the device of FIG. 1 with FIG. 2 also showing the spectacles and illustrating in phantom lines how the head of an individual is accommodated in the device of the invention.
Figure 3:
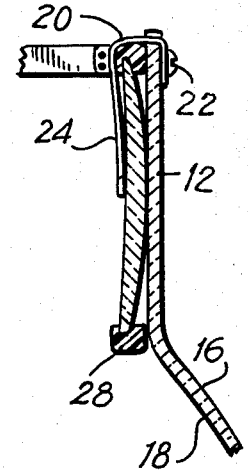
FIG. 3 is a sectional elevation taken along lines 3—3 of FIG. 1 in the direction of the arrows and illustrating details of the mounting means and the part of the device through which the wearer looks.
Figure 4:
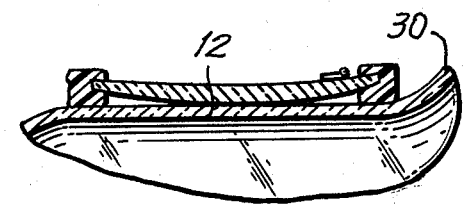
FIG. 4 is a fragmentary sectional plan view taken along line 4—4 of FIG. 1 in the direction of the arrows and showing further details of the device of the invention.

Below its upper flat portion 14 the sheet 10 has an outer convex surface area 16 and an inner concave surface area 18. This inner concave surface area 18 defines for the sheet 10 a hollow interior space which is open at its rear and which is adapted to receive the nose, mouth and chin of the wearer, as is most clearly apparent from FIG. 2.

The device of the invention further includes a mounting means for mounting the sheet 10 on the head of the individual in such a way that the nose, mouth, and chin can be received in the hollow interior defined by the inner concave surface 18 without engaging the inner surface area 18. Thus, according to a further feature of the invention the mounting means includes a pair of clips 20 in the form of simple lengths or wire. These clips 20 have front circular portions through which a pair of screws 22 respectively pass. These screws have heads which engage the front portions of the wire clips 20, and they pass freely through openings formed in the sheet 10. At the rear surface of the upper flat portion of the sheet 14, the screws 22 are threaded with nuts, respectively, which serve to fasten the mounting clips 20 on the sheet 10. These mounting clips 20 have relatively short upper parts extending rearwardly from the upper edge region of the sheet 10, and these relatively short upper parts are joined with the upper ends of elongated downwardly extending rear portons 24 which define with the substantially flat portion 14 spaces for receiving the upper part of a pair of spectacles 26. Thus, the pair of spectacles 26 has a front, lens-carrying portion 28, and the clips 20 extend around and downwardly behind the upper part of the front lens-carrying portion 28 of the spectacles 26. In this way the mounting means formed by the clips 20 enable the sheet 10 to be situated in front of the nose, mouth, and chin of the wearer, in the manner shown in FIG. 2. Thus the inner surface 18 is spaced in front of the nose, mouth, and chin while the sheet 10 has an outer peripheral edge 30 which extends around but is spaced from the face of the individual in such a way that the individual can breathe freely while protected against inhaling germs, foreign bodies, and the like. The clips 20 are capable of mounting the sheet 10 on any spectacles, as has been found from experience, and when the sheet 10 is mounted in the manner shown in FIGS. 1 and 2, it is perfectly comfortable to wear even for relatively long periods of time.

The regions 12 of the flat portion 14 are situated in front of the eyes of the wearer. These regions 12 are perfectly planar and have a constant thickness while being completely clear, transparent, and colorless. Thus, the regions 12 are the regions through which the individual will view the area which is being operated on. As a result of the above construction of the regions 12, the latter regions are capable of letting light pass without any measureable light loss while at the same time there is absolutely no distortion of the light rays so that unobstructed, normal vision is reliably assured while at the same time the eyes are protected.

As was indicated above, at least the regions 12 are made of a clear, colorless plastic having the above optical properties, but it is preferred to make the entire sheet 10 of a clear transparent colorless plastic so that the face of the individual is visible through the device of the invention and both the wearer of the device and people who view the device become readily accustomed thereto with the result that attention is distracted to a minimum by the device of the invention.

In a practical embodiment of the device of the invention, it is made of a perfectly transparent optical plastic having a thickness of only one half a millimeter. The clips 20 are perfectly made of an elastic stainless steel wire and clip very readily on to spectacle frames of any construction.

The total weight of the device of the invention, this total weight being made up of the sheet 10, the clips 20, and the screws 22, as well as the nuts carried thereby, is only on the order of 20–70 grams. The face of the individual is reliably covered by the device of the invention in the manner shown most clearly in FIG. 2. Through the regions 12 it is possible for the individual wearing the device with respect to a horizontal axis free vision through angles which are 45° above and 45° below this horizontal axis, with a lateral vision of 90° to the right and left. Because of the extreme light weight of the device, the individual wearing the device does not feel it so that the device is not only simple and practical but in addition it is very comfortable. Experience has shown that the device provides the desired hygienic properties and prevents infections of the upper respiratory tract while also preventing any injury to the eyes.

Thus, the device lends itself to use by physicians, dentists, and other professional operators, as well as by laboratory technicians and other individuals who carry out operations in environments where infection or injury is likely to the upper respiratory tract and the eyes.

In addition to the above advantages, it is to be noted that the device of the invention can be used repeatedly and can easily be washed so as to be rendered perfectly hygienic between uses of the device.

What is claimed is:

1. A device to protect an individual against inhaling germs, foreign bodies, and the like, comprising a single sheet of substantially rigid material having upper and lower edges and between said edges an outer convex surface area and an opposed inner concave surface area defining a hollow interior portion of the sheet which is adapted to receive the nose, mouth, and chin of the individual, and mounting means connected to said sheet for mounting the latter on the head of an individual in a position where the nose, mouth, and chin of the individual are received in the hollow interior of said sheet without engaging said inner surface area of said sheet, said sheet including a substantially flat portion extending from an upper peripheral edge of said outer convex and inner concave surface areas thereof towards said upper edge and thereby, adapted to be situated adjacent a pair of spectacles and to be situated in front of the eyes of the individual, and said flat portion having a pair of planar clear transparent regions adapted to be situated in front of the eyes of the individual, respectively, and said regions having optical properties according to which light can pass through said regions with substantially no light loss and without distortion of light rays so that the vision of the individual is substantially unaffected by said regions of said flat portion of said sheet, said substantially flat portion having an upper edge region, and said mounting means including a pair of clips fixed to said sheet at said upper edge region thereof outwardly beyond said transparent regions of said flat portion for clipping said sheet to a pair of spectacles.

2. The combination of claim 1 and wherein said sheet is made of a light-weight plastic.

3. The combination of claim 2 and wherein said plastic is clear and transparent.

4. The combination of claim 1 and wherein each of said clips is in the form of a wire member fixed at one end to said sheet and having an elongated portion extending from the upper edge region of the sheet downwardly behind and spaced from said sheet to define with the latter a space for receiving part of a pair of spectacles.

5. The combination of claim 1 and wherein said sheet has a peripheral edge particularly along said inner surface area which is sufficiently great to remain out of engagement with the head of the individual to provide between said edge and the head of the individual a free space through which air can flow freely for breathing purposes.

6. The combination of claim 5 and wherein said sheet together with said clips have a total weight which is on the order of 30 grams.

* * * * *